(12) United States Patent
Haugen et al.

(10) Patent No.: US 10,430,597 B1
(45) Date of Patent: Oct. 1, 2019

(54) GENERATING SEARCH RESULTS FOR PEOPLE

(71) Applicant: Google LLC, Mountain View, CA (US)

(72) Inventors: Frances B. Haugen, Oakland, CA (US); Daniel M. Crichton, Eden Prairie, MN (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/967,847

(22) Filed: May 1, 2018

Related U.S. Application Data

(63) Continuation of application No. 14/994,542, filed on Jan. 13, 2016, now Pat. No. 10,019,589, which is a continuation of application No. 13/604,876, filed on Sep. 6, 2012, now Pat. No. 9,244,985.

(60) Provisional application No. 61/531,196, filed on Sep. 6, 2011.

(51) Int. Cl.
| G06F 17/30 | (2006.01) |
| G06F 21/62 | (2013.01) |
| G06F 16/245 | (2019.01) |
| G06F 16/9535 | (2019.01) |

(52) U.S. Cl.
CPC ............ *G06F 21/62* (2013.01); *G06F 16/245* (2019.01); *G06F 16/9535* (2019.01)

(58) Field of Classification Search
CPC .............. G06F 21/62; G06F 17/30424; G06F 17/30867; G06F 16/245; G06F 16/9535
See application file for complete search history.

(56) References Cited

U.S. PATENT DOCUMENTS

| 7,546,295 | B2* | 6/2009 | Brave | G06F 17/30867 |
| 7,966,325 | B2* | 6/2011 | Singh | G06F 17/30864 |
| | | | | 707/732 |
| 8,055,673 | B2 | 11/2011 | Churchill et al. | |
| 8,346,746 | B2* | 1/2013 | Lakshmanan | G06F 17/30867 |
| | | | | 707/705 |
| 8,515,888 | B2* | 8/2013 | Ventilla | G06Q 10/10 |
| | | | | 706/45 |
| 8,538,959 | B2* | 9/2013 | Jin | G06F 17/30867 |
| | | | | 707/732 |
| 8,538,978 | B2 | 9/2013 | Rakshit | |
| 8,554,756 | B2 | 10/2013 | Gemmell et al. | |
| 8,601,062 | B2 | 12/2013 | Buchheit et al. | |
| 8,676,854 | B2* | 3/2014 | Gruen | G06F 17/30867 |
| | | | | 707/723 |
| 8,682,723 | B2* | 3/2014 | Parsons | G06F 17/30864 |
| | | | | 705/14.52 |
| 8,682,805 | B1* | 3/2014 | Hansen | G06F 17/3087 |
| | | | | 705/1.1 |
| 2004/0162830 | A1* | 8/2004 | Shirwadkar | G06F 16/9535 |
| 2008/0005072 | A1* | 1/2008 | Meek | G06F 17/30867 |
| 2008/0071773 | A1* | 3/2008 | Gross | G06F 16/951 |

(Continued)

*Primary Examiner* — Jared M Bibbee
(74) *Attorney, Agent, or Firm* — Fish & Richardson P.C.

(57) ABSTRACT

Techniques include: receiving a search query; identifying content responsive to the search query; identifying one or more members of a social networking service that have an association with identified content; and outputting, to a computing device, data corresponding to the one or more members, where data corresponding to the one or more members is for generating display areas, and where the display areas are for obtaining information about corresponding members and for display along with search results.

17 Claims, 7 Drawing Sheets

(56) References Cited

U.S. PATENT DOCUMENTS

| | | | | |
|---|---|---|---|---|
| 2008/0228947 | A1* | 9/2008 | Markus | G06F 17/30864 709/217 |
| 2009/0164929 | A1* | 6/2009 | Chen | G06F 17/30867 715/769 |
| 2009/0249451 | A1* | 10/2009 | Su | G06F 17/30867 726/5 |
| 2009/0271374 | A1* | 10/2009 | Korn | G06F 17/30867 |
| 2009/0287682 | A1* | 11/2009 | Fujioka | G06F 17/30867 |
| 2009/0313244 | A1* | 12/2009 | Sokolenko | G06F 17/30864 |
| 2010/0070448 | A1* | 3/2010 | Omoigui | H01L 27/1463 706/47 |
| 2010/0318551 | A1* | 12/2010 | Lai | G06F 16/335 707/765 |
| 2011/0078188 | A1* | 3/2011 | Li | G06Q 30/02 707/776 |
| 2011/0196855 | A1* | 8/2011 | Wable | G06Q 30/02 707/711 |
| 2011/0320423 | A1* | 12/2011 | Gemmell | G06F 17/30867 707/706 |
| 2012/0066202 | A1* | 3/2012 | Hatazawa | G06Q 50/01 707/710 |
| 2012/0124130 | A1* | 5/2012 | Coates | G06F 17/30867 709/203 |
| 2012/0158720 | A1* | 6/2012 | Luan | G06F 17/30867 707/732 |
| 2012/0166432 | A1* | 6/2012 | Tseng | G06Q 30/0261 707/728 |
| 2012/0310926 | A1* | 12/2012 | Gannu | G06Q 30/02 707/723 |
| 2012/0317109 | A1* | 12/2012 | Richter | G06F 17/30867 707/734 |
| 2013/0031106 | A1 | 1/2013 | Schechter et al. | |
| 2013/0036109 | A1* | 2/2013 | Kulick | G06Q 10/10 707/722 |
| 2013/0054631 | A1* | 2/2013 | Govani | G06F 17/30867 707/767 |
| 2013/0275405 | A1* | 10/2013 | Maghoul | G06F 17/30867 707/706 |

* cited by examiner

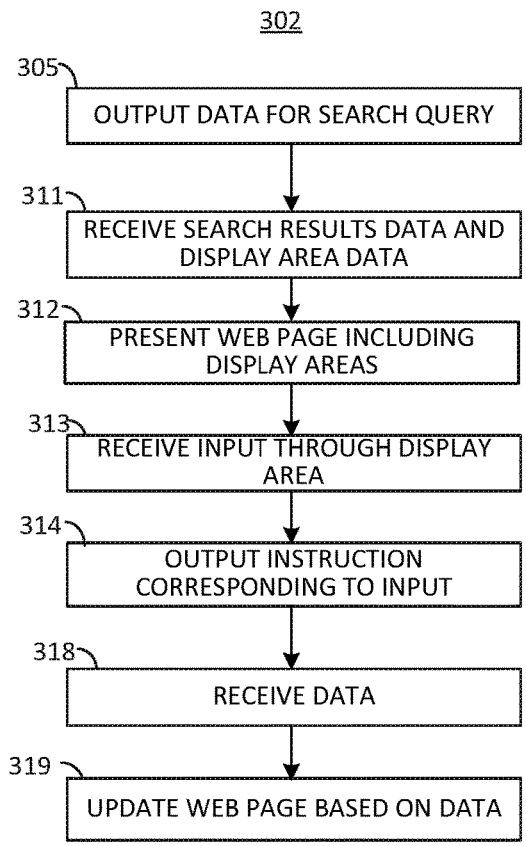
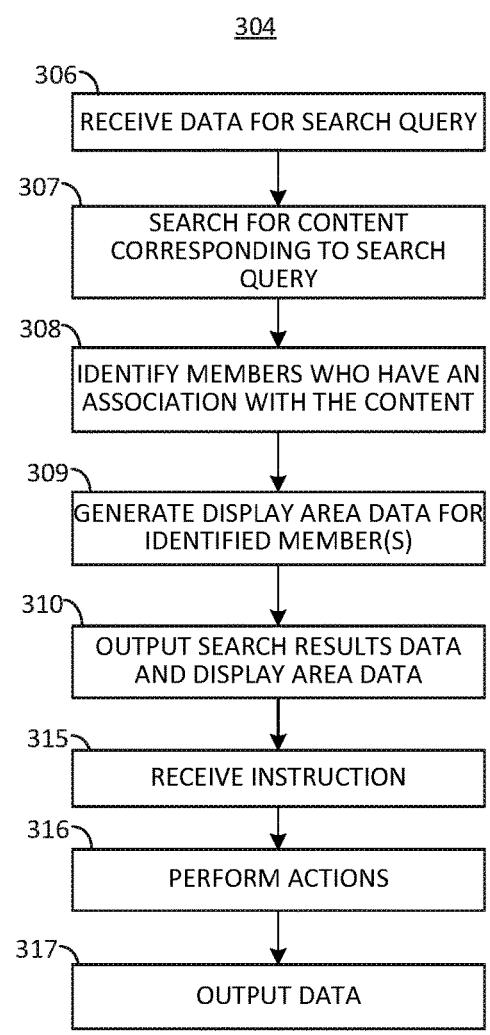
FIG. 3A
FIG. 3B

People View all

Mr. Guy — 501

Alice Stewart
Searchy

Julio Curnule
Searchy

Fava Bean
Searchy

Angus McLaren
Searchy

Jack Johnson
Searchy

Phil Krebs
Website X

500

503

Show more

Best of Most recent

Angus McLaren - August 31, 2011 — 504

Right now...meetings coming up.

| 9:30 – Meeting #1 |
| 10am | 10 – Meeting #2 |
| 10:30 – Meeting #3 |
| 11am | 11 – 12p Meeting #4 |

# GENERATING SEARCH RESULTS FOR PEOPLE

CROSS-REFERENCE TO RELATED APPLICATION

This application is a continuation of U.S. application Ser. No. 14/994,542, filed Jan. 13, 2016, which is a continuation application of U.S. application Ser. No. 13/604,876, filed on Sep. 6, 2012 and issuing as U.S. Pat. No. 9,244,985 on Jan. 26, 2016, which claims priority to U.S. Provisional Application No. 61/531,196, filed on Sep. 6, 2011. The entire contents of each of these applications are hereby incorporated by reference into this disclosure.

BACKGROUND

This disclosure relates generally to generating search results for people, e.g., a display area for member(s) of a social networking service.

Search engines identify resources (e.g., images, audio, video, Web pages, text, documents) that are relevant to a user's needs and present information about the resources in a manner that is useful to the user. A search engine may be used to conduct a search of the Internet, the corpus of a social network, or a combination of the two. A search engine receives a search query from a user, consults an appropriate search index to identify subject matter relevant to the search query, and obtains search results for presentation, e.g., in a Web browser.

Social networks permit members to post information about themselves and to communicate with other people, e.g., friends, family, and co-workers. Social networks also permit members to write, and post content, e.g., blogs, stories, messages, and the like, for public or private consumption.

Members of a social networking service may also author, comment on, or otherwise interact with, content that is not hosted by the social networking service. In this context, such content may include, but is not limited to, public and private content that is accessible through the World Wide Web.

SUMMARY

An example of a technique for generating display areas for members of a social networking service includes the following operations: receiving a search query; identifying content responsive to the search query; identifying one or more members of a social networking service that have an association with identified content; and outputting, to a computing device, data corresponding to the identified content and the one or more members, where data corresponding to the identified content is for generating search results for the identified content, where data corresponding to the one or more members is for generating display areas, and where the display areas are for obtaining information about corresponding members and for affecting display of the search results.

In the foregoing technique, identifying one or more members of the social networking service that have an association with identified content may include identifying one or more of: members who query for a topic of the search query repeatedly, members who post about the topic of the search query repeatedly, members who post about the topic of the search query repeatedly and whose posts are regularly shared on the social networking service, or members who are mentioned in posts that discuss the topic of the search query.

In the foregoing technique, each display area may include access and control features, which may include a link to access a profile of a corresponding member of the social networking service. Examples of operations that may be performed in the foregoing technique may include: receiving an indication from a display area that a link to access a profile of a member corresponding to the display area has been selected; and outputting, to the computing device, data corresponding to the profile of the corresponding member.

In the foregoing technique, the access and control features may include an option to filter search results. Examples of operations that may be performed in the foregoing technique may include: receiving a signal in response to selection of the option on the display area to filter the search results; filtering the identified content to produce filtered content; and outputting snippets to the computing device that correspond to the filtered content. The identified content may be filtered based on an action that a member of the social networking service that corresponds to the display area has taken with respect to the identified content, or an association that the member has with the identified content. The identified content may be filtered to include only content authored by the member or filtered to include only content that is approved by, or comment on by, the member.

In the foregoing technique, the identified content may include content from publicly accessible sources and content from the social networking service; and the indexed content may include content from publicly accessible sources and content from the social networking service. One or more of the display areas may provide one or more options for enabling social interaction, over the social networking service, with subjects of the display areas.

An example of a technique for generating display areas for members of a social networking service may include the following operations: receiving data to generate a user interface on a computer display device; and using the data to generate the user interface on the computer display device. The user interface may include a search field to receive a search query for use in searching Web content and the corpus of a social networking service; a results display area to display search results received in response to a search initiated through the search field; and display areas corresponding to members of the social networking service that have an association with content corresponding to the search results, where the display areas are for obtaining information about corresponding members and for affecting display of the search results.

In the foregoing technique, members who have an association with content corresponding to the search results may include members who: query for a topic of the search query repeatedly, post about the topic of the search query repeatedly, post about the topic of the search query repeatedly and whose posts are regularly shared on the social networking service, or are mentioned in posts that discuss the topic of the search query.

In the foregoing technique, each display area may include access and control features, which include a link to access a profile of a corresponding member of the social networking service. In response to selection of a link of a display area, a profile of a member identified in the display area may be displayed.

The access and control features may include an option to filter search results. In response to selecting an option in a display area to filter the search results, filtered search results may be received from a search engine; and only the filtered search results may be displayed in the results display area. The search results may be filtered based on an action that a member of the social networking service that corresponds to the display area has taken with respect to content associated with the search results, or an association that the member has with the content.

In the foregoing technique, content may be filtered to include only content authored by the member. The filtered search results that are displayed may include only snippets of content that is authored by the member.

In the foregoing technique, the identified content may be filtered to include only content that is approved by, or comment on by, the member. The filtered search results that are displayed may include only snippets of content that have been approved by, or comment on by, the member.

In the foregoing technique, search results may include content from publicly accessible sources and content from the social networking service.

Advantages of the foregoing techniques may include, e.g., facilitating access to user information in a social networking service for users who have some affiliation with search results (e.g., are experts in a topic of the search results, have an interest in the search results, and so forth).

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 3A is a flowchart showing an example of a process for incorporating a display area for a member of a social networking service into a display of search results.

FIG. 3B is a flowchart showing an example of a process for generating data that is used to produce the display area of FIG. 3A.

FIG. 5 is an example of a user profile for a member of the social networking service.

Like reference symbols in the various drawings indicate like elements.

DETAILED DESCRIPTION

Figure 1:
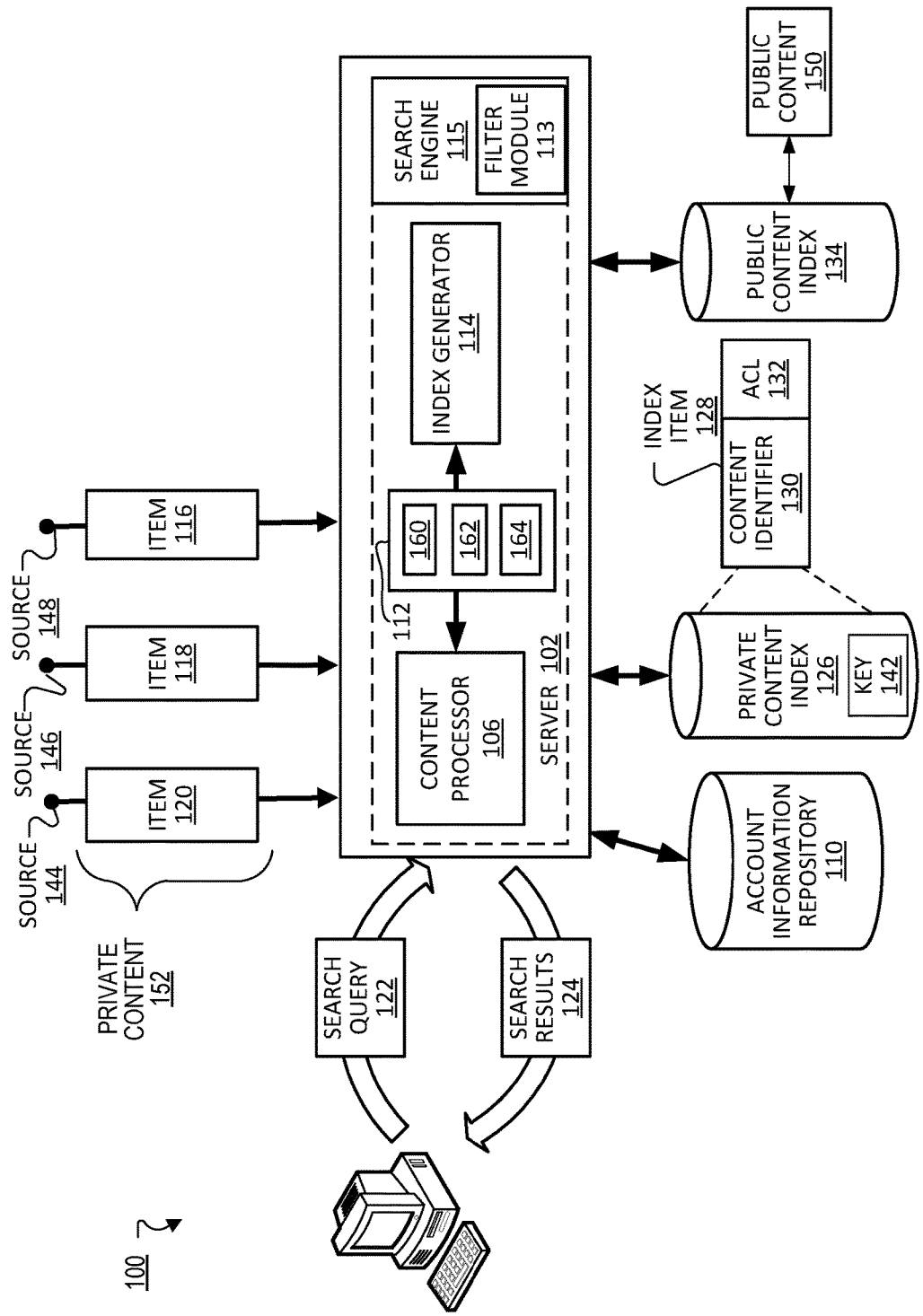
FIG. 1 is a block diagram of an example of a system that may be used to incorporate a display area for a member of a social networking service into a display of search results.

Described herein is a system for incorporating a display area, e.g., a display area contained in a single box, other shape (e.g. a one-box), or window, for members of a social networking service into a display of search results. Typically, the display area is a feature on a Web page that enables access to information about a subject. For example, the display area for a member of a social networking service may include a picture of the member, along with links, e.g., to that member's profile.

The system includes a server that runs a search engine, to search repositories of indexed content in response to a search query. The searching may be performed to identify content relevant to the search query and to identify member(s) of the social networking service that have an association with the resulting identified content. For example, the searching may be performed to obtain information about the Red Sox. In this case, the key words in the search may, but need not, include the words "Red Sox". In other cases, the search query may not be a text query; e.g., the search query may be an image or other type of query. In this example, in addition to searching for information about the Red Sox (e.g., on the Internet), the system may also search for members of the social networking service who have an affinity for the Red Sox. The system may determine that members have affinity for a particular topic by, e.g., identifying members who query for the search topic repeatedly, members who post about the search topic repeatedly, members who post about the search topic repeatedly and whose posts are regularly shared on the social networking service, and members who are mentioned in posts that discuss the topic. This information may be obtained, e.g., from the corpus of the social network or other network.

The server outputs the search results to the computing device on which the search was initiated. In this example, data corresponding to the identified search content is output for rendering, e.g., in a browser of the computing device. Also output to the computing device is data for rendering a display area for each member that has an association with the search content. In the above example, the search results may include, e.g., links to information about the Red Sox, links to information about the 2004 World series, images of the series and the Red Sox, links to video of the series and the Red Sox, and so forth. In the above example, display areas of members who have an affinity or association with subject of the search—here, the Red Sox—are also displayed, along with the search results.

The display areas may be displayed left, right, above or below the search results display area (e.g., in a sidebar). The display areas may identify members of the social networking service who, e.g. have taken an action relating to the identified content or have an association with the identified content. For example, the display areas may identify members who are experts on the content associated with the search results, e.g., who have authored, or commented on, content that appears in the search results.

In the above example, the members whose display areas are depicted may be experts on, or simply fans of, the Red Sox, baseball, sports, or another topic that may be associated with a search for the Red Sox. The expertise or interest of a member may be identified, e.g., based on information that is publicly or privately available (and access to that information is permitted by the owner). For example, if a database indicates that a member is an expert in a particular topic, that member may be deemed to be an expert by the system. Furthermore, if a number of member interactions with content relating to a topic exceeds a threshold within a specified time, that member may be deemed to have an interest or an expertise in the corresponding topic. For example, if a member interacts 10 times in a week with content about a topic, that member might be deemed interested in that topic. If that same member interacts 100 times in a week with content about a topic, that member might be deemed an expert in that topic. In other examples, a person may be identified as having expertise in, or interest in, a particular topic based, e.g., on a number of endorsements of content by that person about the topic, a number of mentions about that person in relation to the topic, a listing in a professional directory, one or more credentials associated with person (e.g., a degree, award, membership in a professional society, and so forth), or some combination of these and/or other appropriate information indicative of expertise or interest.

In some implementations, the system may check to determine if a person has a certain minimum number of qualifications prior to listing that person as an expert. In some examples, members may be ranked based on their qualifications. For example, if a search query relates to engineering, the system may identify members known to have engineering degrees and highlight those members over others who merely comment on, or post, regarding engineering.

Members may elect not to have themselves identified in display areas through a provision, e.g., on such members' profiles. Additionally, members may decide not to enable display for themselves or other members in certain circumstances. For example, two members of a social network may be connected professionally but not necessarily on a non-professional level. Accordingly, the example systems described herein may take into account the type of connection between two members (as specified in a social graph) and produce a display area in certain cases, but not in other cases. For example, a member may specify (e.g., in their profile) constraints about which other members may be displayed or about when they may be displayed as experts for others, e.g., at certain times of day, in response to certain types of queries, with certain other members (e.g., those with professional connections or non-professional connections), and so forth.

The display areas may include pictures of corresponding members, along with access and control features. Appropriate access and control features may be incorporated into members' display areas. For example, a member's display area may contain a hyperlink to a member's profile. That hyperlink may be associated with the member's picture. That is, selecting (e.g., touching or clicking-on) the member's picture in the display area may cause that member's profile to be retrieved and displayed. Another access and control feature may trigger filtering of search results. That access and control feature may be a link or button, for example, that is incorporated into the display area. In response to selecting that feature (e.g., touching or clicking-on the link), the server filters the search results according to one or more specified criteria. For example, the server may be programmed to filter the search results so that only search results associated with a member whose display area access and control feature is selected are output to, and displayed by, a user's computing device. In the above "Red Sox" example, one of the members whose display area appears may be a sports writer. Upon selection of an appropriate link, the search results may be filtered to show only snippets of content authored by that member. An appropriate filtering may be performed.

The system described herein, may be implemented in an appropriate search system, with an appropriate devices and computing equipment. An example of such a system is described below with respect to FIGS. 1 and 2.

FIG. 1 is a block diagram of an example of a system that may be used to incorporate a display area for a member of a social networking service into a display of search results. Specifically, FIG. 1 shows a system 100 that can be used to search private content 152 and public content 150. In this context, private content can include access-restricted content. Access to the private content may be limited by searcher and/or group restrict(s) associated with that content. Public content, generally, refers to content to which access is not restricted.

System 100 includes server 102. Server 102 includes content processor 106 which, in some examples, includes a crawling engine. Content processor 106 is configured to determine private content 152 from sources 144, 146, 148, including, e.g., social networking Web sites, picture hosting Web sites, online email providers, and so forth, that content processor 106 is authorized by users to access. In this regard, users can decide to/not to grant access to their private content, e.g., users can prevent their private content from being accessed.

In the example of FIG. 1, private content 152 includes a collection of items, e.g., items 116, 118, 120. Content processor 106 may be configured to determine sources 144, 146, 148 of private content to retrieve items 116, 118, 120. In another example, sources 144, 146, 148 may send items 116, 118, 120 to content processor 106, e.g., at pre-defined time intervals and/or when sources 144, 146, 148 obtain new items, including items that were not previously sent to content processor 106.

System 100 also includes account information repository 110. Account information repository 110 is configured to store information for accessing accounts associated with sources 144, 146, 148. In an example, a user is provided with the option of specifying which private content may be determined by the content processor and/or of specifying that only public content 150 be searched for a user.

Before storing items 116, 118, 120 of private content 152, content processor 106 may be configured to translate content in items 116, 118, 120 to a normalized format. Generally, normalization includes reformatting disparate types of content items into a standardized structure.

In this example, content processor 106 generates normalized items 160, 162 164 by normalizing the content of items 116, 118, 120. Content processor 106 groups together normalized items 160, 162, 164 into a collection, namely, normalized private content 112. In this example, normalized private content 112 is sent to other modules in server 102 as a data feed, e.g., rather than individually sending normalized items 160, 162, 164. In this regard, in some implementations, users can decide to allow/not allow access to their private content.

Server 102 also includes an index generator 114. Index generator 114 is configured to index private content 152 and to index public content 150. Index generator 114 is also configured to update these indexes with new information, including new content and new information about restrictions (e.g., restricts) on access to the indexed content.

Server 102 also includes search engine 115 for searching indexed private and public content. Search engine 115 may include, e.g., a crawling engine to determine content, an indexing engine to index crawled content, and a ranking engine to rank content in the index (not shown). In some implementations, content processor 106 may be part of the crawling engine and index generator 114 may be part of the indexing engine of search engine 115 (as depicted graphically by the dotted line in FIG. 1). In other implementations, content processor 106 and index generator are separate from, e.g., outside of, search engine 115.

Search engine 115 may also include a filter module 113. Filter module 113 may filter obtained search results based on one or more criteria, and output the filtered results to the client device. For example, filter module 113 may restrict output of search results only to search results authored by a particular member of the social networking service. In another example, filter module 113 may restrict output of search results only to search results commented on by a particular member of the social networking service. In another example, filter module 113 may restrict output of search results only to search results endorsed by a particular member of the social networking service. In another example, filter module 113 may restrict output of search results only to search results somehow associated with one or more members of the social networking service. Generally, an appropriate filtering may be performed. The type of filtering applied may be predefined in the search engine, or it may be set on a member-by-member basis. For example, each member may set, using a set-up user interface (not shown), the type of filter that they would like applied to other members during a search process. In another example, each user may specify the type of filtering that they would like applied to them during searching. Member may disable this filtering operation.

In the example of FIG. 1, index generator 114 generates private content index 126, which indexes private content 152. For example, using normalized items 160, 162, 164, index generator 114 generates corresponding index items, e.g. 128, and stores the index items in private content index 126.

Each indexed item, e.g. 128, includes a content identifier 130 and an ACL 132. Content identifier 130, includes, e.g., portions of an item of private content that index generator 114 has determined are relevant for identifying and/or for searching the item of private content, information describing the item, keywords for the item, and/or a unique identifier for the item.

An ACL, e.g. 132, is associated with each content item. The ACL includes searcher restricts identifying entities who are authorized to access the corresponding item of content (here, 128) and/or group restrict(s) identifying groups of entities who are authorized to access the corresponding item of content. In an example, index generator 114 identifies users and groups that are permitted to access corresponding content items in the search index. This information may be obtained, e.g., from the items themselves or from accounts or other information that are accessible, e.g. on a social networking service. For example, a sender of a content item is typically permitted future access to that content item. Likewise, a group of entities associated with a same account of a social networking service may be permitted access to the same information. Index generator 114 incorporates the appropriate individual and/or group restricts into ACL 132.

Items 116, 118, 120 of private content 152 may include sensitive and/or confidential information (collectively referred to herein as confidential information, without limitation, for purposes of convenience). In an example, item 116 includes such confidential information. When generating content identifier 130 of index item 128, index generator 114 includes at least a portion of the confidential information in content identifier 130. To promote secure storage of the confidential information in index item 128, index generator 114 may encrypt content identifier 130 using an encryption key, namely, key 142. Prior to including index item 128 in a search, search engine 115 may, optionally, determine that a user requesting the search is permitted access to confidential information in content identifier 130.

In still another example, content identifier 130 of index item 128 may be associated with a wrapped key (not shown). Generally, a wrapped key includes an encrypted key. To unwrap (e.g., decrypt) the wrapped key, server 102 sends the wrapped key to another security system (not shown). The security system sends the unwrapped key to server 102. The unwrapped key is used by search engine 115 to decrypt content identifier 130.

In some implementations, index generator 114 also generates public content index 134 for public content 150, including, e.g., publicly accessible Web pages, publicly accessible Web sites, publicly accessible documents, and other publicly accessible information. Index generator 114 may generate public content index 134 by crawling the World Wide Web and indexing Web pages. Items of public content may have associated ACLs indicating, e.g., that there are no restrictions on access. In cases where access to public content is restricted, appropriate restricts may be incorporated into those ACLs. Alternatively, some Items of public content need not include ACLs.

In a variation of the system shown in FIG. 1, index generator 114 may generate a single index for indexing private content 152 and public content 150, e.g., rather than generating separate indexes 126 and 134. In another variation of the system shown in FIG. 1, index generator 114 may generate individual private and public content indexes for users of system 100, e.g., rather than generating private and public content indexes 126 and 134, which may index private content 152 and public content 150. In an example, index generator 114 generates an index (not shown) indexing items of private content that are accessible to a particular user. In this example, index generator 114 also generates another, different index (not shown) indexing items of public content that are also accessible to the particular user.

In the example of FIG. 1, system 100 also includes client device 104. Using client device 104, a user (not shown), submits a search query 122 to server 102. In this example, search query 122 includes one or more search terms. Appropriate searcher and/or group restricts are incorporated automatically into the search query, and are sent to the search engine along with the search query.

Search engine 115 receives search query 122. In the example of FIG. 1, search engine 115 searches both private content index 126 and public content index 134. As described below, search engine 115 determines which items 116, 118, 120 of private content 152 the user has permission to access.

Following a determination that the user has access, e.g., to item 116 of private content 152, search engine 115 determines a relevancy of item 116 to search query 122. In this example, search engine 115 determines a relevance score for item 116 using content identifier 130 and search terms included in search query 122. Generally, a relevance score includes a measure of likelihood to be responsive to a search query.

In an example, search engine 115 identifies items 116, 118, 120 of private content 152 as relevant to search query 122. Search engine 115 generates search results for items 116, 118, 120. Generally, a search result includes information containing content from an item of information and a reference to a location of the item of information. A reference may include a link and/or a pointer from one item of information to another item of information.

Search engine 115 also searches public content index 134 for items of public content 150 that may be relevant to search query 122. For items of public content identified as relevant to search query 122, search engine 115 also generates search results for the items of public content 150.

Search engine 115 generates search results 124 by combining search results for items of private content 152 with search results for items of public content 150 that are relevant to search query 122. Search engine 115 ranks search results 124 in accordance with relevance of search results 124 to search query 122, and sends the search results 124 to client device 104.

Figure 2:
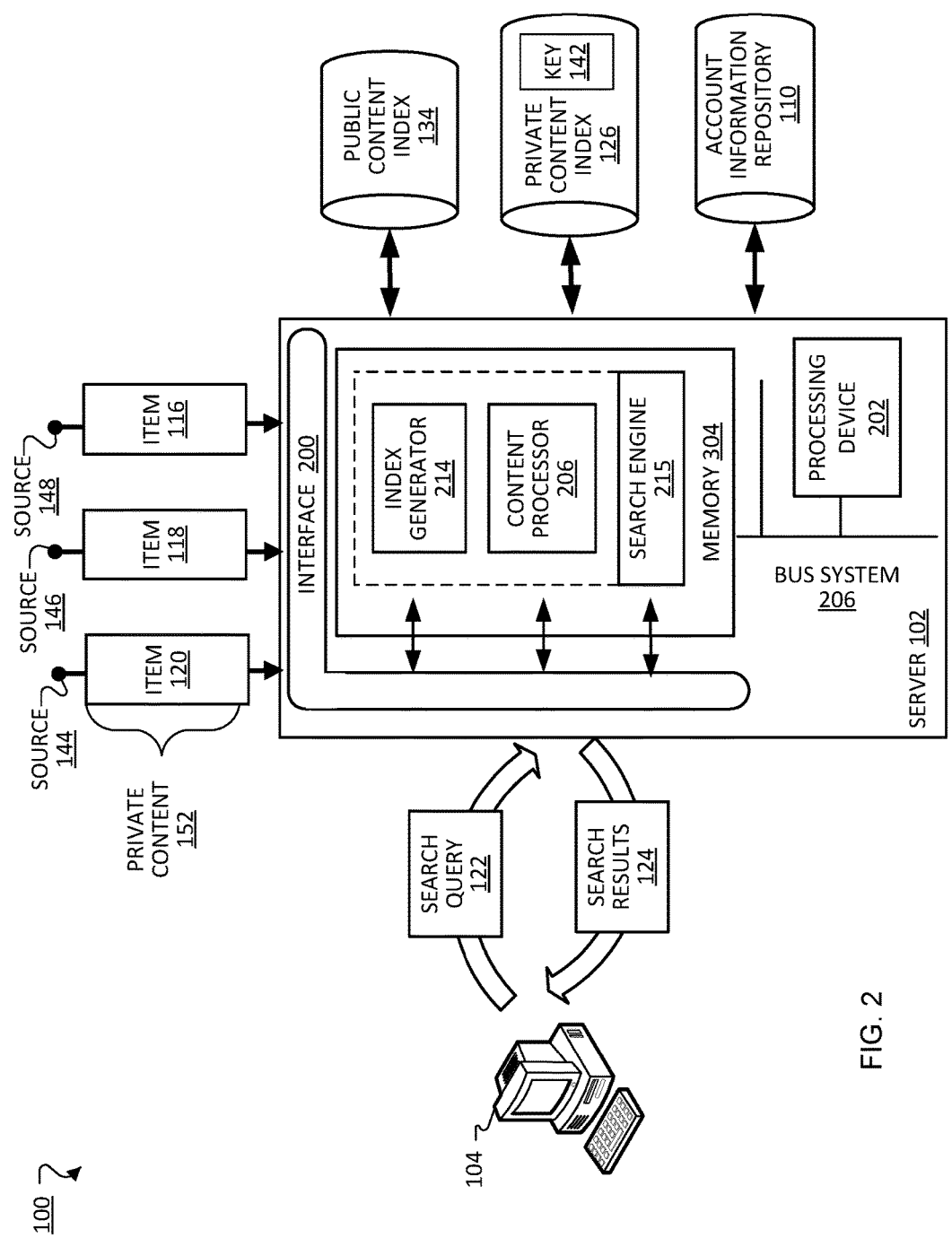
FIG. 2 is a block diagram of an example of hardware on which the system of FIG. 1 may be implemented.

FIG. 2 is a block diagram an example of hardware on which the system of FIG. 1 may be implemented. Specifically, FIG. 2 shows components of system 100 for implementing the processes described herein. In the example of FIG. 2, normalized private content 112, normalized items 160, 162, 164, index item 128, content identifier 130, ACL 132, and public content 150 are not shown.

Client device 104 can be a computing device capable of taking input from a user and of communicating over a network (not shown) with server 102 and/or with other client devices. The network can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Client device 104 can be or include a type of computing device examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance, a bus). Although a single client device 104 is shown in FIGS. 1 and 2, system 100 can include a plurality of client devices, which can be geographically dispersed.

Server 102 can be a variety of computing devices capable of receiving information and running one or more services, which can be accessed by client device 104. In an example, server 102 can include a server, a distributed computing system, a desktop computer, a laptop, a cell phone, a rack-mounted server, and the like. Server 102 can be a single server or a group of servers that are at a same location or at different locations.

Client device 104 and server 102 can run programs having a client-server relationship to each other. Although distinct modules are shown in the figures, in some examples, client and server programs can run on the same device.

Server 102 can receive information from client device 104 and from sources 144, 146, 148 through input/output ("I/O") interface 200. I/O interface 200 can be a type of interface capable of receiving information over a network, e.g., an Ethernet interface, a wireless networking interface, a fiber-optic networking interface, a modem, and the like. Server 102 also includes a processing device 202 and memory 204. A bus system 206, including, for example, a data bus and a motherboard, can be used to establish and to control data communication between the components of server 102.

Processing device 202 can include one or more microprocessors, computers, or processing entities, e.g., virtual machines. Generally, processing device 202 can include an appropriate processor and/or logic that is capable of receiving and storing data, and of communicating over a network (not shown). Memory 204 can include a hard drive and random access memory storage, e.g., dynamic random access memory, or other types of non-transitory machine-readable storage devices. As shown in FIG. 2, memory 204 stores computer programs that are executable by processing device 202. These computer programs include index generator 114, search engine 115, and content processor 106, among others.

FIG. 3A is a flowchart showing an example of a process 302 for incorporating a display area for a member of a social networking service into a display of search results. FIG. 3B is a flowchart showing an example of a process 304 for generating data that is used to produce the display area of FIG. 3A.

In the following example, process 302 may be performed on a computing device, e.g., client device 104 (FIG. 1), and process 304 may be performed by search engine 115 on server 112.

Figure 4:
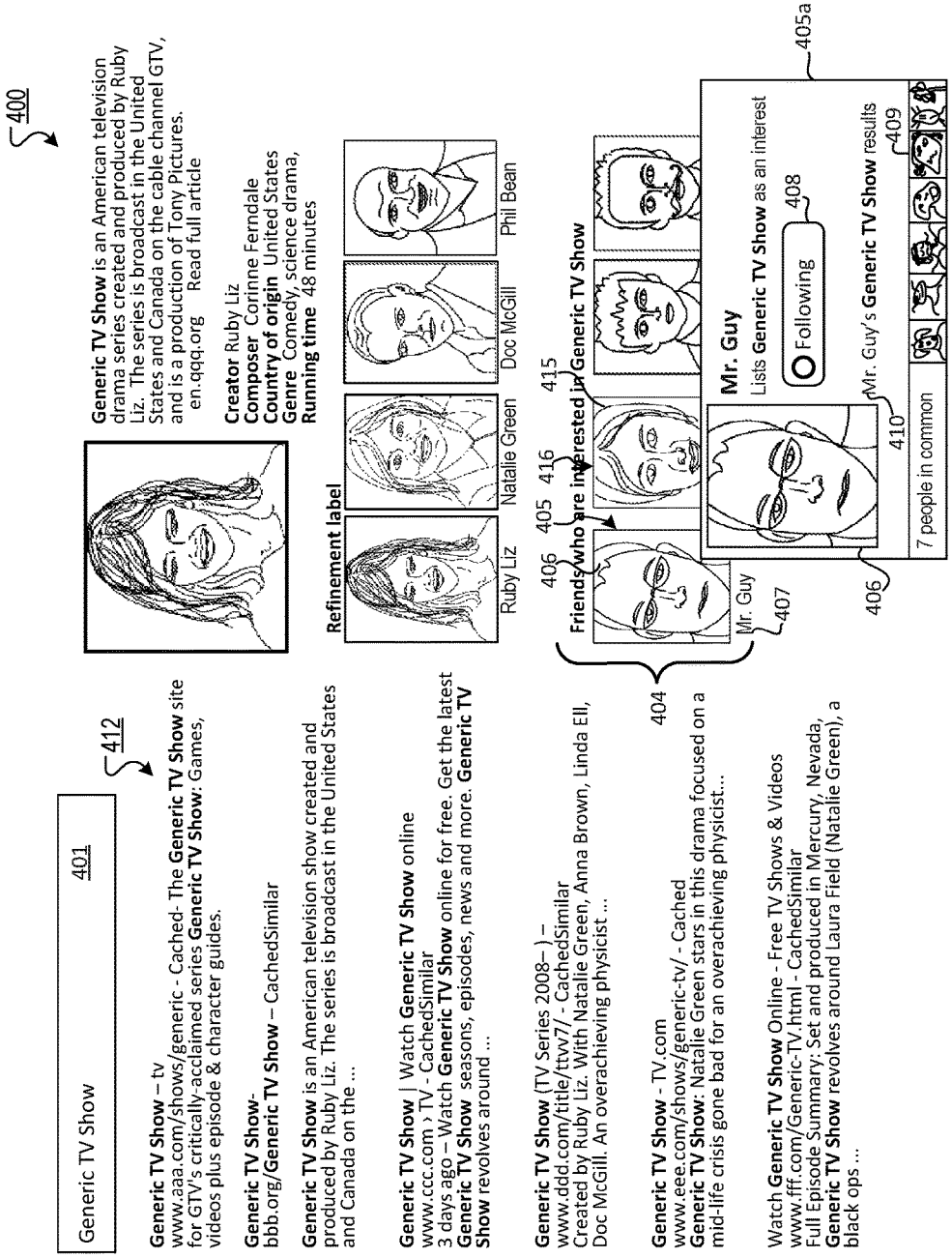
FIG. 4 is an example of an example of a Web page showing search results and display areas for members that have an association with the search results.

According to process 302, a user at client device 104 inputs a search query into the search field of a Web page, e.g., search field 401 of Web page 400, which is shown in FIG. 4. Web page 400, in this example, is generated by a search engine capable of searching a social networking service and other sources of data, e.g., the Internet. The search engine which, in this example is search engine 115, searches public content and private content (where authorized) including, but not limited to, the Internet and the corpus of the social networking service.

A Web browser on client device 104 outputs (305) data for the search query to search engine 115. Process 304 receives (306) that data for the search query, and performs (307) a search to identify content corresponding to the search query. As noted, the content that is identified may be from public and/or private sources. Search engine 115 ranks the identified content, e.g., according to its relevance to the search query, and retrieves snippets of the ranked content for transmission to client device 104. In this example, the snippets may include relevant text, images and/or video, along with links thereto, where appropriate. In the example of FIG. 4, the input search query is "Generic TV Show", which causes search engine 115 to retrieve search results for the television show, "Generic TV Show", along with appropriate member display areas 404, as explained below.

Process 304 also identifies (308) one or more members of the social networking service who have an association with the topic of the search query. For example, search engine 115 may identify members who authored content on the search query topic, members who are noted experts in the search query topic, members who query for the search topic repeatedly, members who post about the search topic repeatedly, members who post about the search topic repeatedly and whose posts are regularly shared on the social networking service, members who are affiliated with the topic on the Internet, and/or members who are mentioned in posts that discuss the topic. Other appropriate associations of members to the topic may also be identified, e.g., those noted above.

Search engine 115 may identify such members using information found in their member profiles, which are public or authorized by the members for searching. In this example, member profiles may be searched using key words found in an input search query. In other implementations, the search query may not be text-based, but rather may include an image or other content that can be found in a search index. In this example, members whose profiles contain those key words may be identified (308). Alternatively, only specific parts of members' profiles may be searched for the key words. For example, the key words may appear under an "interests" or "occupation" section of the profile if such sections exits. Search engine may be programmed, e.g., to search only these (or other) parts of the members' profiles for the key words found in the search query.

In other examples, search engine 115 may search elsewhere in the corpus of the social networking service or in indexes of other networks for information indicating that a member thereof has an association with the topic of the search query. For example, search engine 115 may search one or more databases to identify members who query for the search topic repeatedly, members who post about the search topic repeatedly, members who post about the search topic repeatedly and whose posts are regularly shared on the social networking service, and members who are mentioned in posts that discuss the topic. In some examples, the social networking service may maintain a database of members who are known experts in, or who are determined to have some in interest in, certain fields. Such a database may be used to identify members who have associations with the topic of the search query. Such information about members may be gathered on a regular basis from sources like those noted above.

As noted, information may be found outside of the corpus of the social networking service. For example, search engine may search an index of the Internet, or other appropriate network index in order to identify members of the social networking service who have an association with the topic of the search query. As was the case above, such a search may be performed to identify a member who is an expert on a topic, who is interested in a topic, or who has another appropriate association with a topic. For example, the search engine may identify a number of times a member is mentioned in the same content as the key words and, if that number exceeds the threshold, infer that the member has an interest or is an expert in that topic. The search engine may also use synonyms or words related to the input key words to identify members. The search engine may also search groups or membership registrations. For example, if the input search key words were "Red Sox", the search engine may examine the current roster of Red Sox players and identify members of the social networking service who are on that roster. An appropriate method may be used to identify an association between a member of the social networking service and a topic of the search query.

After identifying (308) members of the social networking service who have an association with the input key words, process 304 generates (309) data that can be used to present display areas for such members. In this example, a display area includes an image, if available, of the member. If no image is available, a stock image or blank box may be used. The image is associated with a link to that member's profile on the social networking service. The display area may also include other access and control features. For example, the display area may include a link to trigger filtering of the search results, as described in more detail below.

Process 304 outputs (310) data for the search results and the display areas to client device 104. At client device 104, process 302 receives (311) that data, and uses that data to present (312) a Web page on a display device associated with client device 104. Web page 400 of FIG. 4 is an example of such a Web page. Web page 400 includes display areas for members 404 of the social networking service who have an association with the input search query. In this example, a display area 405 includes a user's picture 406 and a link 407 to that user's profile on the social networking service. Hovering over display area 405 cause the display area to magnify in size, as shown in FIG. 4. In the magnified version 405a of display area 405, a user of the social networking service is provided with an option 408 to connect (here, "follow") subject of the display area. In other implementations, options may be provided to chat with the subject, to add the subject to the user's social graph, to send invitation(s) to connect on one or more social networks, to access content (e.g., through one or more links) authored by the subject or otherwise associated with the subject, to add the subject to a buddy list, and to enable any other appropriate social interaction, if so permitted.

A control feature 410 is also provided to filter search results 412 displayed in the search results display area. In this example, the control feature is a link, through which a user can initiate filtering of the search results. Filtering, in this context, may include displaying only the search results associated with the member whose link was selected. The association may include an appropriate relationship between the member and the search results. For example, the search results may be filtered to display only content authored by the member, to display only content commented-on by the member, to display only content posted by the member, to display content in which the member is mentioned, to display only content by the member that has been shared repeatedly, to display only content in which the member has an interest, or a combination thereof.

At this point processing may end. For example, a user viewing Web page 400 may simply select appropriate links to find out more about the topic that was searched. In an example where processing continues, however, a user selects an access and control feature of a display area, e.g., the user may select link 407 to view a member's profile or link 410 to filter the search results. In this case, client device (through Web page 400) receives (313) data corresponding to the selection, and outputs (314) a signal (e.g., an instruction) to search engine 115 indicating which access and control feature was selected.

Process 304 receives (315) the signal and performs (316) the appropriate action indicated by the signal. For example, if the signal indicates to view the social networking profile of the subject of the display area, search engine 115 retrieves the appropriate profile from the indexed corpus of the social networking service or from another appropriate database, and outputs (317) data corresponding to that profile to client device 104. An example of a user profile 500 is shown in FIG. 5. As shown, user profile 500 includes a picture 501 of the subject of the display area, pictures 503 of other members of the social networking service who are connected to the subject, a latest post 504 from the subject, and a calendar 505 showing activities that the subject (member) has planned, among other things.

Figure 6:
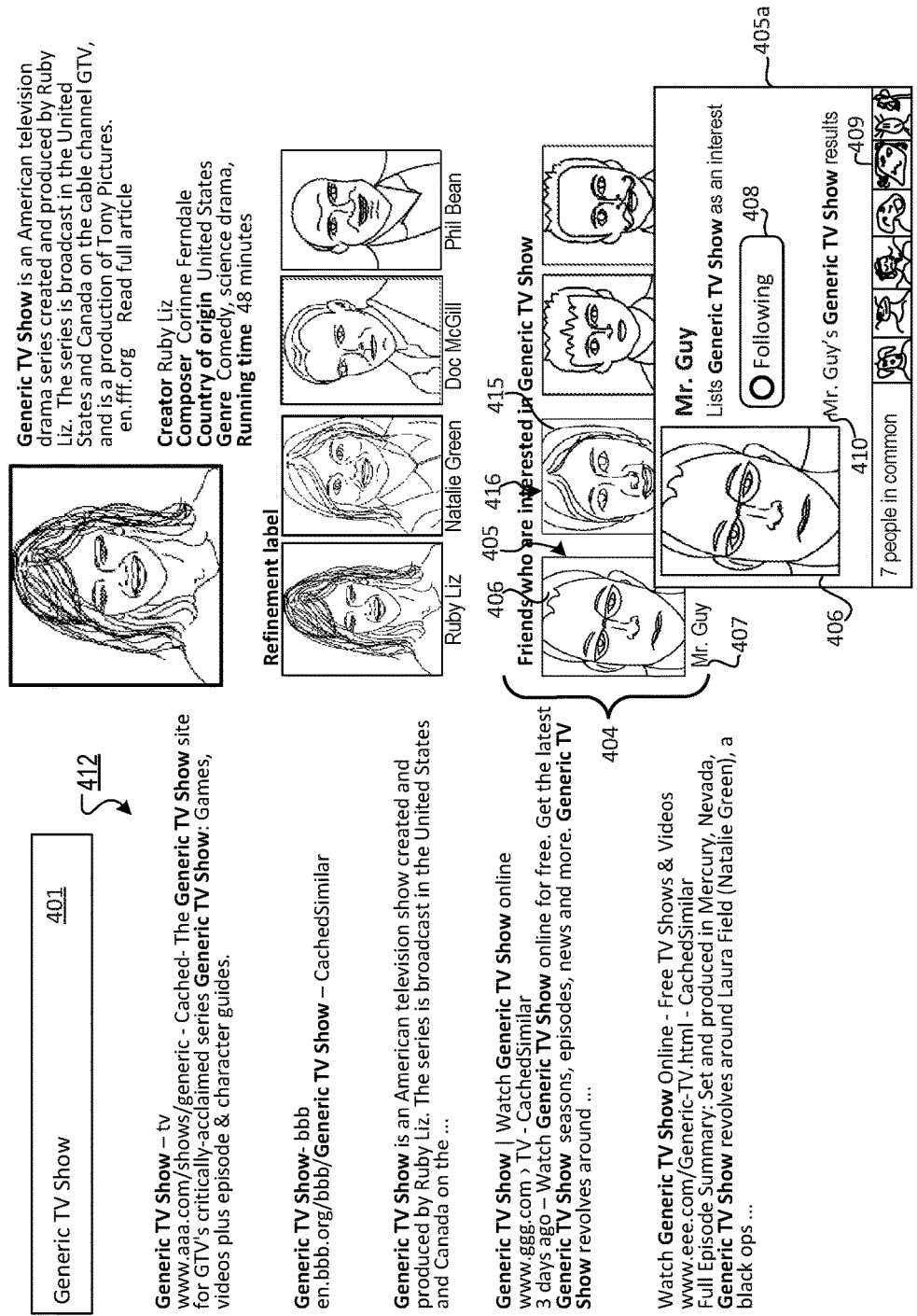
FIG. 6 is an example of a Web page showing search results that have been filtered for a member of the social networking service.

If the signal indicates to filter the search results, search engine 115 performs whatever filtering is associated with the display area. In this example, that filtering is to display search results that are authored by, or commented on by, the subject of display area 405. The type of filtering may be defined by filter module 113, as described above. After filter module 113 filters the search results, search engine 115 outputs (317) data for the filtered search results to the requesting client device 104. At client device 104, process 302 receives (318) the data and updates (319) the search results page to display the filtered search results. For example, as shown in FIG. 6, the search results page 600 is updated (319) to include hyperlinks to only search results that were authored by, or commented on by, the subject of display area 405.

In some implementations, process 304 may employ levels of filtering on the displayed search results. For example, at a first level, the search results may be filtered for member 406. At a next level, the remaining displayed search results (i.e., those filtered for member 406) may be filtered for member 415, and so on. So, for example, at the second level of filtering, displayed search results will include only search results authored by, or commented on by both, the subject of display area 405 and the subject of display area 416.

Figure 7:
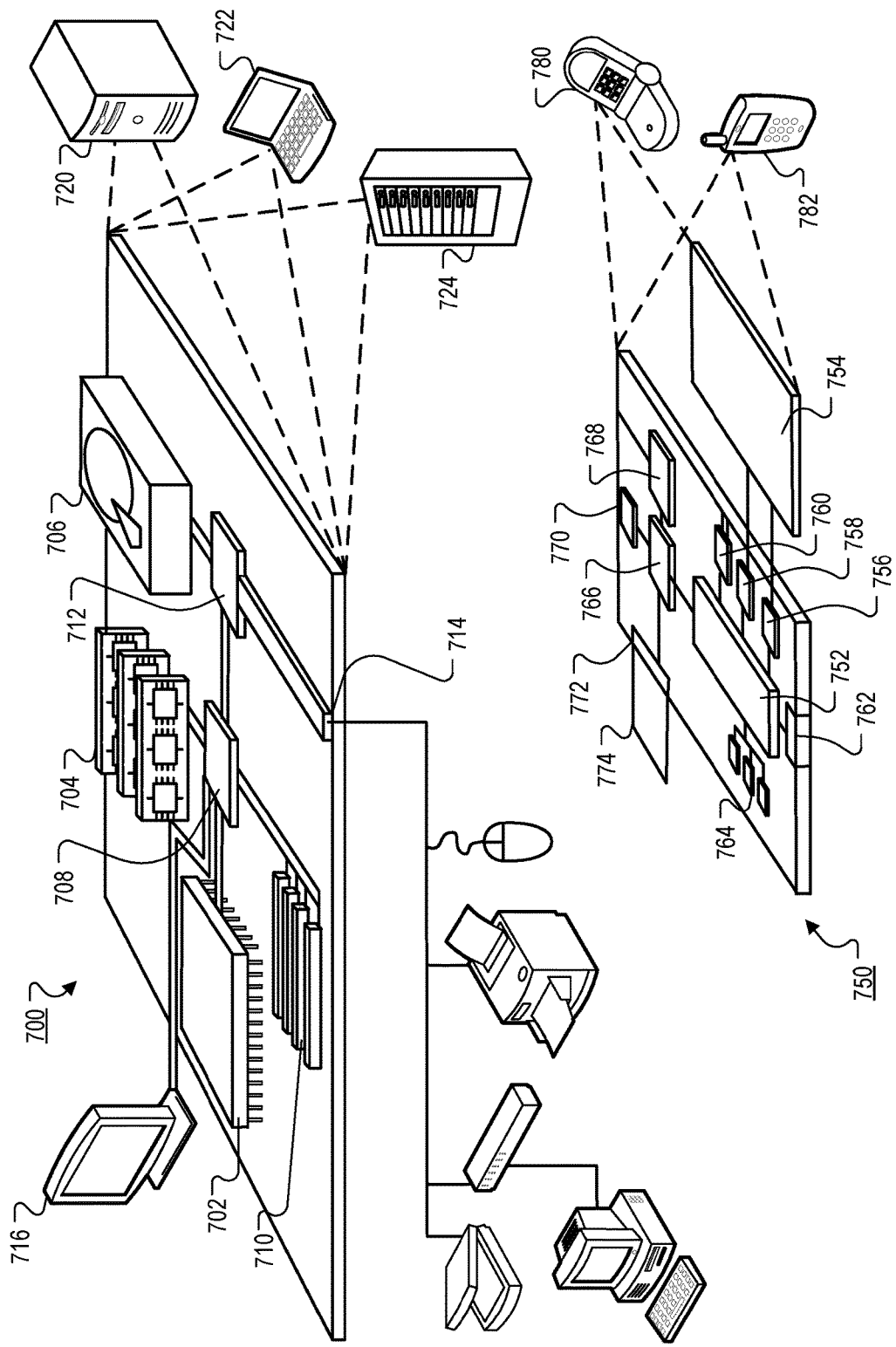
FIG. 7 shows examples of computing devices on which the processes described herein, or portions thereof, may be implemented.

FIG. 7 shows examples of computing devices on which the processes described herein, or portions thereof, may be implemented. In this regard, FIG. 7 shows an example of a generic computing device 700 and a generic mobile computing device 750, which may be used to implement the processes described herein, or portions thereof. For example, server 202 and associated index(es) may be implemented on computing device 700. Mobile computing device 750 may represent a client device 204 of FIGS. 2 and 3. Other client devices of FIGS. 2 and 3 may also have the architecture of computing device 700.

Computing device 700 is intended to represent various forms of digital computers, examples of which include laptops, desktops, workstations, personal digital assistants, servers, blade servers, mainframes, and other appropriate computers. Computing device 750 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, for example, display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, examples of which include a magnetic or optical disk.

The storage device 706 is capable of providing mass storage for the computing device 700. In one implementation, the storage device 706 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 704, the storage device 706, memory on processor 702, or a propagated signal. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer, e.g., a laptop computer 722. Alternatively, components from computing device 700 may be combined with other components in a mobile device (not shown), e.g., device 750. Each of such devices may contain one or more of computing device 700, 750, and an entire system may be made up of multiple computing devices 700, 750 communicating with each other.

Computing device 750 includes a processor 752, memory 764, an input/output device, e.g. a display 754, a communication interface 766, and a transceiver 768, among other components. The device 750 may also be provided with a storage device, e.g., a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, e.g., control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, e.g., using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, e.g., through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems and techniques discussed herein determine personal information about users, the users may be provided with an opportunity to enable/not enable programs or features that may determine personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

Other implementations not specifically described herein are also within the scope of the following claims.

What is claimed is:

1. A computer-implemented method comprising:
   receiving a search query;
   obtaining one or more search results that a search engine identifies as responsive to the search query;
   identifying (i) a topic of the search query, and (ii) one or more members of a social network that are indicated as having expertise in the topic of the search query;
   generating a search results page that includes (i) one or more of the search results, and (ii) a region that includes, for each of the one or more members of the social network that are indicated as having expertise in the topic of the search query, information identifying that particular member and a control for filtering the search results to include only those search results that the search engine has identified as responsive to the search query and that are associated with that particular member; and
   providing the search results page for output.

2. The method of claim 1, comprising indicating members that have authored a threshold amount of content on the topic as having expertise in the topic.

3. The method of claim 1, comprising indicating members that have repeatedly submitted queries associated with the topic as having expertise in the topic.

4. The method of claim 1, comprising indicating members that have repeatedly posted about the topic as having expertise in the topic.

5. The method of claim 1, comprising indicating members whose respective posts have been shared on the social network as having expertise in the topic.

6. The method of claim 1, wherein the information comprises a visual representation of one or more of the members.

7. The method of claim 1, wherein, for each member, the control comprises a control for filtering out content not authored by that particular member.

8. The method of claim 1, wherein, for each member, the control comprises a control for filtering out content not commented-on by that particular member.

9. The method of claim 1, wherein, for each member, the control comprises a control for filtering out content not posted by that particular member.

10. The method of claim 1, wherein, for each member, the control comprises a control for filtering out content that does not mention that particular member.

11. The method of claim 1, wherein, for each member, the region comprises a link to a social network profile associated with that particular member.

12. The method of claim 1, wherein, for each member, the region comprises a link for establishing a connection with that particular member.

13. A non-transitory computer-readable storage device storing instructions, that when executed by one or more processors, cause performance of operations that comprise:
   receiving a search query;
   obtaining one or more search results that a search engine identifies as responsive to the search query;
   identifying (i) a topic of the search query, and (ii) one or more members of a social network that are indicated as having expertise in the topic of the search query;
   generating a search results page that includes (i) one or more of the search results, and (ii) a region that includes, for each of the one or more members of the social network that are indicated as having expertise in the topic of the search query, information identifying that particular member and a control for filtering the search results to include only those search results that the search engine has identified as responsive to the search query and that are associated with that particular member; and
   providing the search results page for output.

14. A system comprising:
   one or more processing devices; and
   one or more storage devices storing instructions that are executable by the one or more processing devices to perform operations comprising:
   receiving a search query;
   obtaining one or more search results that a search engine identifies as responsive to the search query;
   identifying (i) a topic of the search query, and (ii) one or more members of a social network that are indicated as having expertise in the topic of the search query;
   generating a search results page that includes (i) one or more of the search results, and (ii) a region that includes, for each of the one or more members of the social network that are indicated as having expertise in the topic of the search query, information identifying that particular member and a control for filtering the search results to include only those search results that the search engine has identified as responsive to the search query and that are associated with that particular member; and providing the search results page for output.

15. The system of claim 14, comprising indicating members that have authored a threshold amount of content on the topic as having expertise in the topic.

16. The system of claim 14, wherein the operations comprise indicating members that have repeatedly submitted queries associated with the topic as having expertise in the topic.

17. The system of claim 14, comprising indicating members that have repeatedly posted about the topic as having expertise in the topic.

\* \* \* \* \*